United States Patent
Väre et al.

(10) Patent No.: US 9,225,472 B2
(45) Date of Patent: Dec. 29, 2015

(54) SIGNALING OF LAYER 1 SIGNALING TRANSMISSION IN BROADCAST/MULTICAST NETWORKS

(75) Inventors: Jani Petteri Väre, Kaarina (FI); Miika Sakari Tupala, Turku (FI)

(73) Assignee: Nokia Technologies Oy, Espoo (FI)

( * ) Notice: Subject to any disclaimer, the term of this patent is extended or adjusted under 35 U.S.C. 154(b) by 582 days.

(21) Appl. No.: 13/522,013

(22) PCT Filed: Jan. 15, 2010

(86) PCT No.: PCT/US2010/021176
§ 371 (c)(1),
(2), (4) Date: Jul. 12, 2012

(87) PCT Pub. No.: WO2011/087507
PCT Pub. Date: Jul. 21, 2011

(65) Prior Publication Data
US 2012/0300690 A1    Nov. 29, 2012

(51) Int. Cl.
*H04L 1/00* (2006.01)

(52) U.S. Cl.
CPC ............ *H04L 1/0079* (2013.01); *H04L 1/0072* (2013.01)

(58) Field of Classification Search
CPC .................................................. H04L 27/2602
See application file for complete search history.

(56) References Cited

U.S. PATENT DOCUMENTS

| | | | |
|---|---|---|---|
| 8,411,737 B2 | 4/2013 | Tupala et al. | |
| 2003/0169769 A1* | 9/2003 | Ho et al. | 370/473 |
| 2010/0086087 A1 | 4/2010 | Pekonen et al. | |
| 2010/0226426 A1* | 9/2010 | Tupala et al. | 375/240.01 |

FOREIGN PATENT DOCUMENTS

| WO | 2007/074214 A1 | 7/2007 |
|---|---|---|
| WO | 2011/068505 A1 | 6/2011 |

OTHER PUBLICATIONS

"Digital Video Broadcasting (DVB); Fame structure channel coding and modulation for a second generation digital terrestrial television broadcasting system (DVB-T2)", European standard (telecommunications series), European telecommnications standards institute (ETSI), Jul. 2009 (Sep. 2009).*

"Digital Video Broadcasting (DVB); Frame Structure Channel Coding and Modulation for a Second Generation Digital Terrestrial Television Broadcasting System (DVB-T2)", ETSI EN 302 755, V1.1.1, Sep. 2009, pp. 1-167.

(Continued)

*Primary Examiner* — Huy D Vu
*Assistant Examiner* — Bao G Nguyen
(74) *Attorney, Agent, or Firm* — Nokia Technologies Oy

(57) ABSTRACT

Embodiments may include apparatuses, computer media, and methods for receiving at least one data symbol for transmission in a data frame, generating signaling information that identifies transmission parameters for the data frame, wherein the signaling information includes a first signaling portion and a second signaling portion, wherein the second signaling portion includes at least a third signaling portion and a fourth signaling portion, generating at least one first size information for the third signaling portion, generating at least one second size information for the fourth signaling portion, adding the at least one first size information and the at least second size information to the first signaling portion, and assembling, by at least one processor, the data frame comprising at least the first signaling portion, the second signaling portion, and the at least one data symbol.

18 Claims, 11 Drawing Sheets

(56) References Cited

OTHER PUBLICATIONS

"Frame Structure Channel Coding and Modulation for a Second Generation Digital Terrestrial Television Broadcasting System (DVB-T2)", DVB Document A122, Revision 1, Jan. 2008, pp. 1-165.

International Search Report and Written Opinion received for corresponding International Patent Application No. PCT/US2010/021176, dated Aug. 26, 2010, 15 pages.

Office action received for corresponding ARIPO Patent Application No. AP/P/2012/006388, dated Dec. 10, 2014, 5 pages.

* cited by examiner

SIGNALING OF LAYER 1 SIGNALING TRANSMISSION IN BROADCAST/MULTICAST NETWORKS

RELATED APPLICATION

This application was originally filed as PCT Application No. PCT/US2010/021176 filed Jan. 15, 2010.

BACKGROUND

Digital Video Broadcasting (DVB) systems distribute data using a variety of approaches, including by satellite (DVB-S, DVB-S2 and DVB-SH), DVB-SMATV for distribution via SMATV), cable (DVB-C), terrestrial television (DVB-T), second generation digital terrestrial television (DVB-T2), and digital terrestrial television for handhelds (DVB-H, DVB-SH). Digital Video Broadcasting (DVB) is a suite of internationally accepted open standards for digital television. DVB standards are maintained by the DVB Project, an international industry consortium with more than 270 members, and are published by a Joint Technical Committee (JTC) of European Telecommunications Standards Institute (ETSI), European Committee for Electrotechnical Standardization (CENELEC) and European Broadcasting Union (EBU). The associated standards define the physical layer and data link layer of a distribution system. Devices interact typically with the physical layer through a synchronous parallel interface (SPI), synchronous serial interface (SSI), or asynchronous serial interface (ASI). Data is typically transmitted in MPEG-2 transport streams with some additional constraints (DVB-MPEG).

The distribution systems for the different DVB standards differ in the modulation schemes and error correcting codes used, due to the different technical constraints. For example, DVB-S Super High Frequency (SHF) uses quadrature phase shift keying (QPSK), 8PSK or 16-quadrature amplitude modulation (QAM). DVB-S2 uses QPSK, 8PSK, 16 amplitude and phase shift keying (APSK) or 32APSK. QPSK and 8PSK are the only versions regularly used. DVB-C (VHF/UHF) uses QAM: 16-QAM, 32-QAM, 64-QAM, 128-QAM or 256-QAM. DVB-T (VHF/UHF) uses 16-QAM or 64-QAM (or QPSK) in combination with Coded Orthogonal Frequency Division Multiplexing (COFDM) and can support hierarchical modulation.

SUMMARY

The following presents a simplified summary in order to provide a basic understanding of some aspects of at least some example embodiments. The summary is not an extensive overview. It is neither intended to identify key or critical elements nor to delineate the claim scope. The following summary merely presents some concepts in a simplified form as a prelude to the more detailed description below.

Embodiments may include apparatuses, computer media, and methods for receiving at least one data symbol for transmission in a data frame, generating signaling information that identifies transmission parameters for the data frame, wherein the signaling information includes a first signaling portion and a second signaling portion, wherein the second signaling portion includes at least a third signaling portion and a fourth signaling portion, generating at least one first size information for the third signaling portion, generating at least one second size information for the fourth signaling portion, adding the at least one first size information and the at least second size information to the first signaling portion, and assembling, by at least one processor, the data frame comprising at least the first signaling portion, the second signaling portion, and the at least one data symbol.

BRIEF DESCRIPTION OF THE DRAWINGS

A more complete understanding of various embodiments and may be acquired by referring to the following description in consideration of the accompanying drawings, in which like reference numbers indicate like features and wherein.

DETAILED DESCRIPTION

In the following description of various embodiments, reference is made to the accompanying drawings which form a part hereof, and in which is certain embodiments and/or features of certain embodiments are shown by way of illustration. It is to be understood that other embodiments may be utilized and structural and functional modifications may be made without departing from the scope of the present disclosure.

Figure 1:
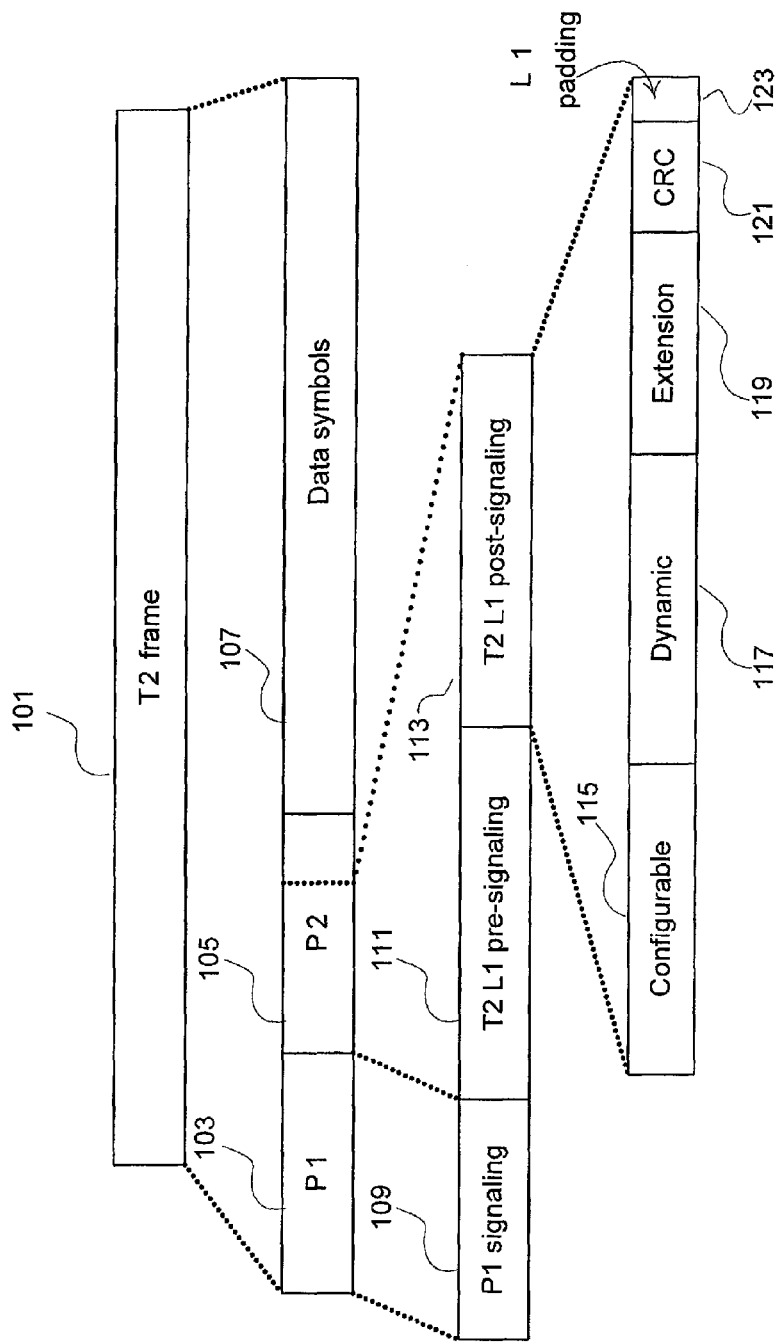
FIG. 1 shows an illustrative layer 1 (L1) signaling transmission in a T2 frame.

FIG. 1 shows a layer 1 (L1) signaling transmission in a T2 frame 101 corresponding to the physical layer. Except as described below in connection with various signaling mechanisms discussed herein, the format and content of T2 frame 101 may be specified in "Frame structure channel coding and modulation for a second generation digital terrestrial television broadcasting system (DVB-T2)," DVB Document A122r1, January 2008, the contents of which is hereby incorporated by reference in its entirety. The physical layer is the first (for example, the "lowest") level in the seven-layer open system interconnection (OSI) reference model of computer networking. The physical layer translates communications requests from the data link layer into hardware-specific operations to affect transmission or reception of electronic signals. A bit stream may be grouped into code words or symbols and converted to a physical signal that is transmitted over a hardware transmission medium.

T2 frames 101 may be grouped into super frames, consisting of a selected number of T2 frames. Each frame 101 may start with a P1 symbol 103, followed by one or more P2 symbols 105 and then one or more data symbols 107. Each frame includes only one P1 symbol, although embodiments may include a plurality of P1 symbols. P1 symbol 103 is a fixed pilot symbol that carries P1 signaling information 109 and is located in the beginning of frame 101 within each radio frequency (RF)-channel. P1 symbol 103 may be used for a fast initial signal scan. P2 symbols 105 are pilot symbols located right after P1 symbol 103 and have the same fast Fourier Transform (FFT) size and guard interval as the data symbols 107. P2 symbols carry T2 L1 pre-signaling 111 and T2 L1 post-signaling 113. The number of P2 symbols depends on the FFT size. P2 symbols 105 may be used for fine frequency and timing synchronization as well as for initial channel estimates. Data symbols 107 are Orthogonal Frequency Division Multiplexing (OFDM) symbols in frame 101 that are not P1 or P2 symbols. Data symbols 107 typically convey data content that are associated with different physical layer pipes (PLPs). A PLP may carry one or multiple services.

A PLP may denote a physical layer time division multiplex (TDM) channel that is carried by specified sub-slices. A sub-slice is a group of cells from a single PLP, which before frequency interleaving, is transmitted on active OFDM cells with a consecutive address over a single radio frequency (RF) channel. Different PLPs may carry data that has been modulated using schemes based on different constellations or other modulation parameters, and data in different PLPs may be coded using different forward error correction (FEC) schemes.

Time-slicing may reduce the average power consumption of a receiver and may enable smooth and seamless handover. Time-slicing may entail sending data in bursts using a higher instantaneous bit rate as compared to the bit rate required if the data were transmitted using a traditional streaming mechanism. A receiver may have one or more buffer memories for storing the decoded time sliced transmission before presentation.

In DVB-T2, data is transmitted through PLPs that may have different coding and modulation parameters. Signaling at the physical layer indicates how to decode and demodulate the different PLPs. L1 signaling may be transmitted in a preamble of P2 OFDM symbols, and, in DVB-T2, the number of P2 symbols may be fixed for the FFT size used.

L1 signaling may be divided into T2 L1 pre-signaling (T2 L1-pre) 111 and T2 L1 post-signaling (T2 L1-post) 113, where T2 L1-pre 111 acts as a key for receiving T2 L1 post-signaling 113 including PLP mappings. The terms "pre" and "post" may not imply a temporal order, and instead may distinguish the signaling 111 from signaling 113.

T2 L1-post 113 may be further divided into a configurable part 115 and a dynamic part 117, where configurable parameters comprise static signaling data that may change only at a super frame border. Configurable parameters may change only when the system configuration is changed (for example, when PLPs are added or removed). Dynamic parameters may refer to the mapping of each PLP to T2 frame 101 and may change from frame to frame within a superframe. Configurable and dynamic parts 115 and 117 of T2 L1 post-signaling 113 may be transmitted in the same code words.

T2 L1-post signaling 113 may also include optional extension field 119 that allows for expansion of L1 post-signaling. A cyclic redundancy check (CRC) 121 provides error detection of any errors that may occur in T2 L1-post signaling 113. A 32-bit error detection code may be applied to the entire T2 L1 post-signaling 113 including configurable part 115, dynamic part 117, and extension part 119. L1 padding 123 is a variable-length field that is inserted following the L1-post CRC field 121 to ensure that multiple Low Density Parity Check (LDPC) blocks of the L1 post-signaling have the same information size when the L1 post-signaling is segmented into multiple blocks and when these blocks are separately encoded. The values of the L1 padding bits, if any, may be set to "0".

Figure 2:
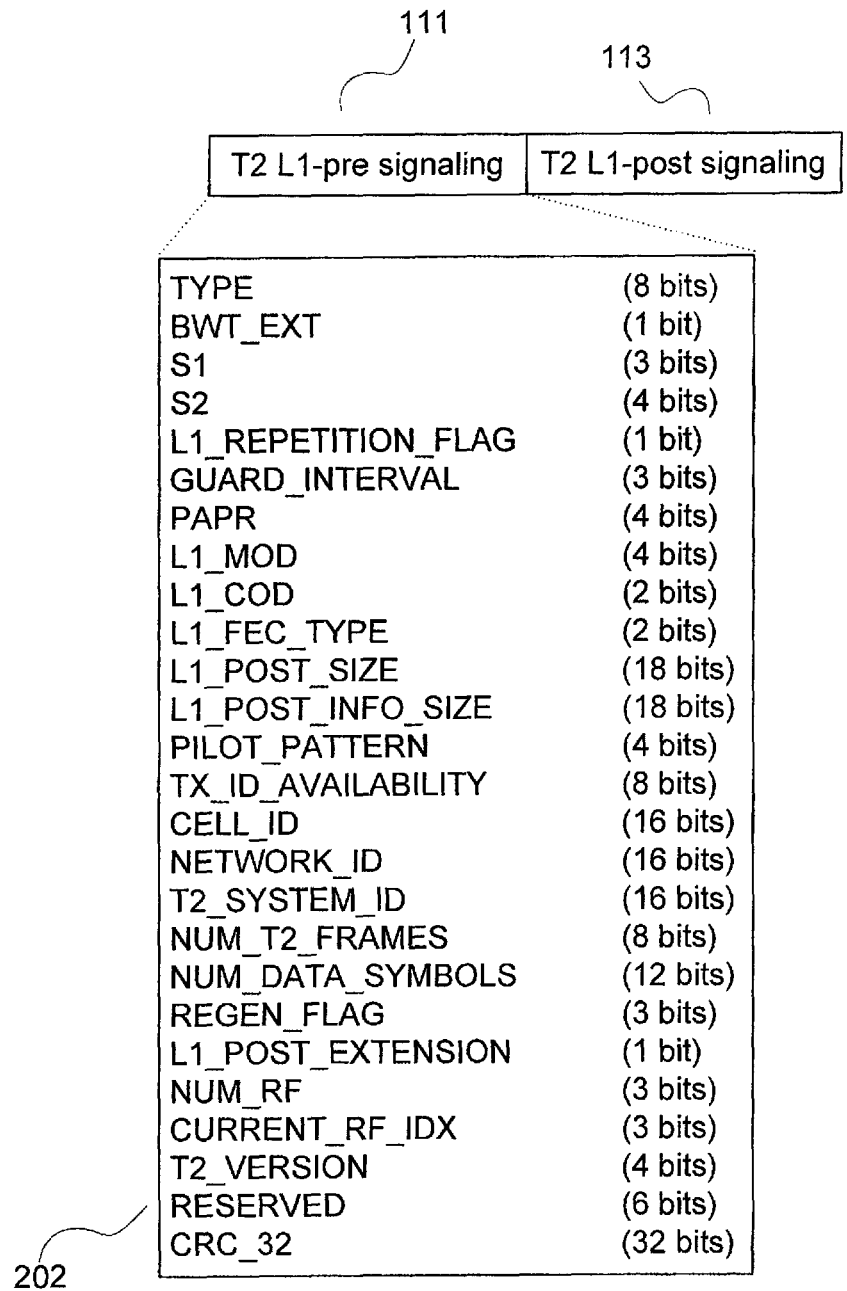
FIG. 2 shows an example of DVB-T2 L1 pre signaling content.

FIG. 2 shows an example of DVB-T2 L1 pre signaling content. In DVB-T2, 44 bits of the T2 L1 pre signaling 111 signal parameters of the T2 L1-post signaling 113, including: modulation (L1_MOD), code rate (L1_COD), FEC code block type (L1_FEC_TYPE), size of the L1-post signaling block in OFDM cells (L1_POST_SIZE), and size of the L1-post signaling information block in bits (L1_POST_INFO_SIZE). In some instances, L1_COD may be fixed to ½ and L1_FEC_TYPE may be 16200, so these two signaling fields might be omitted from T2 L1 pre signaling 111.

Figure 3:
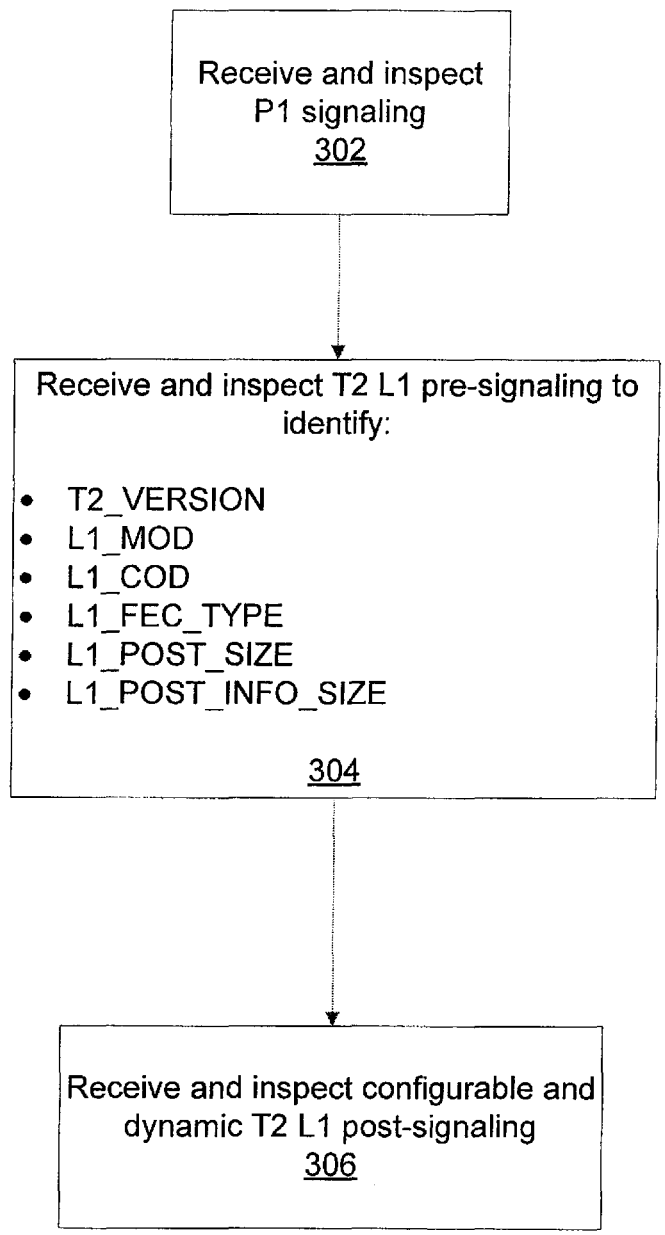
FIG. 3 is a flow diagram according to DVB-T2 for processing of a received T2 frame.

FIG. 3 is a flow diagram according to DVB-T2 for processing of a received T2 frame. In block 302, a receiver may receive and inspect P1 signaling 109 in the T2 frame 101. In block 304, a receiver may receive and inspect T2 L1 pre-signaling 111 to identify a T2_version, L1_MOD, L1_COD, L1_FEC_TYPE, L1_POST_SIZE, and L1_POST_INFO_SIZE for decoding the T2 L1-post signaling 113. In block 306, a receiver may receive and inspect the configurable 115 and dynamic 117 signaling of the T2 L1 post-signaling 113 to extract at least some of the data symbols 107 from the T2 frame 101. The configurable signaling 115 may specify parameters that remain the same from frame to frame in a superframe, and the dynamic signaling 117 may specify parameters that change from frame to frame in the superframe.

Figure 4A:
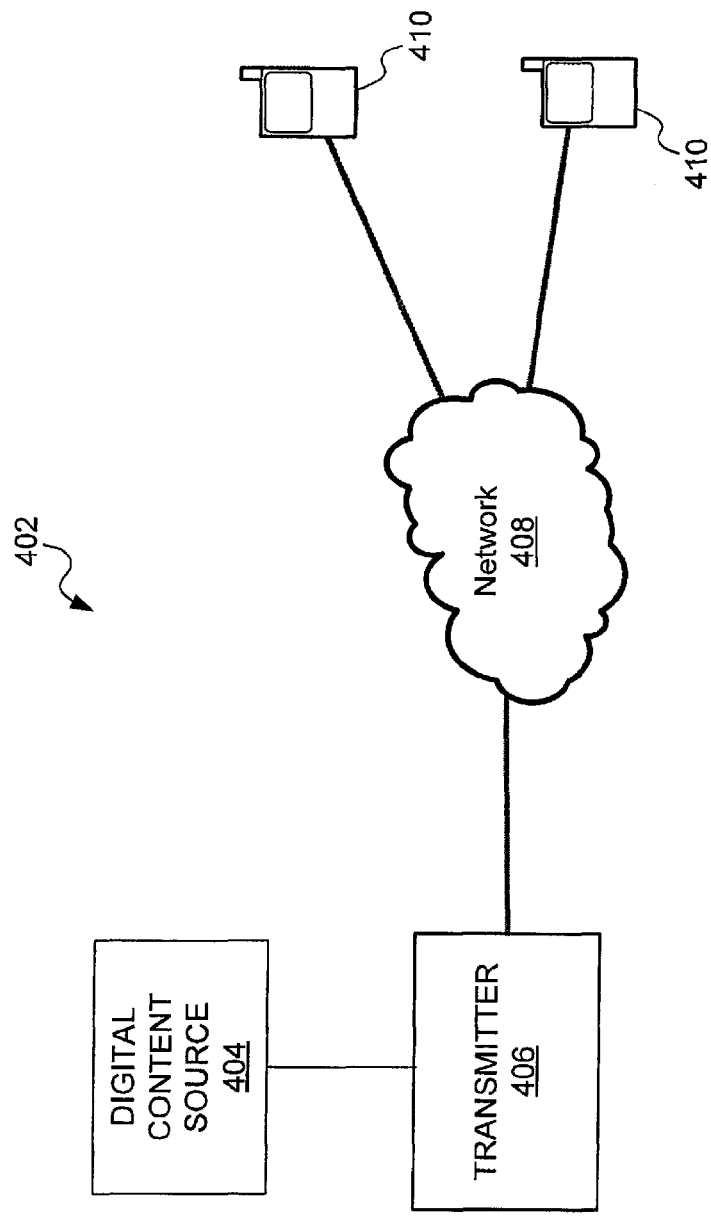
FIG. 4A illustrates an example digital broadcast or multicast system in which one or more illustrative embodiments may be implemented.

FIG. 4A illustrates an example digital broadcast or multicast system 402 in which one or more illustrative embodiments may be implemented. The digital broadcast or multicast system 402 may utilize a digital broadcast technology, for example a multicast and/or broadcast system that is based on orthogonal frequency division multiplexing (OFDM), Digital Video Broadcast-Handheld (DVB-H), next generation DVB-H networks, Digital Video Broadcasting New Generation Handheld (DVB-NGH), Digital Video Broadcast Terrestrial Second Generation-Terrestrial (DVB-T2), or other DVB standards, such as DVB-MHP, DVB-Satellite (DVB-S), or DVB-Terrestrial (DVB-T). Other digital broadcast standards which may be used by the digital broadcast system 402 include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Similarly, other digital transmission formats may be used to deliver content and information of availability of supplemental services, such as, NTSC (National Television System Committee), ISDB-T (Integrated Services Digital Broadcasting-Terrestrial), DMB (Digital Multimedia Broadcasting), or DIRECTV. Other digital broadcasting or multicast standards and techniques, now known or later developed, may also be used. Aspects of the embodiments may also be applicable to other multicarrier digital broadcast or multicast systems such as, for example, T-DAB, T/S-DMB, ISDB-T, and ATSC, proprietary systems such as Qualcomm MediaFLO/FLO, and non-traditional systems such as Third Generation Partnership Project (3GPP) MBMS (Multimedia Broadcast/Multicast Services) and 3GPP2 BCMCS (Broadcast/Multicast Service).

Digital content sources 404 may provide digital services (for example, programs, channels, content, etc.) to a transmitter 406, which may be, for example, a head end system for communicating the digital services to one or more user terminals 410. The transmitter 406 may communicate one or more transport streams including T2 frames 101 via network 408 for wired or wireless transmission to one or more user terminals 410. Network 408 may be a single network or may include multiple interworked networks. User terminals 410 may be mobile phones, smart phones, personal digital assistants (PDAs), computers, other mobile/wireless devices, or other computational devices configured to receive data from network 408.

Figure 4B:
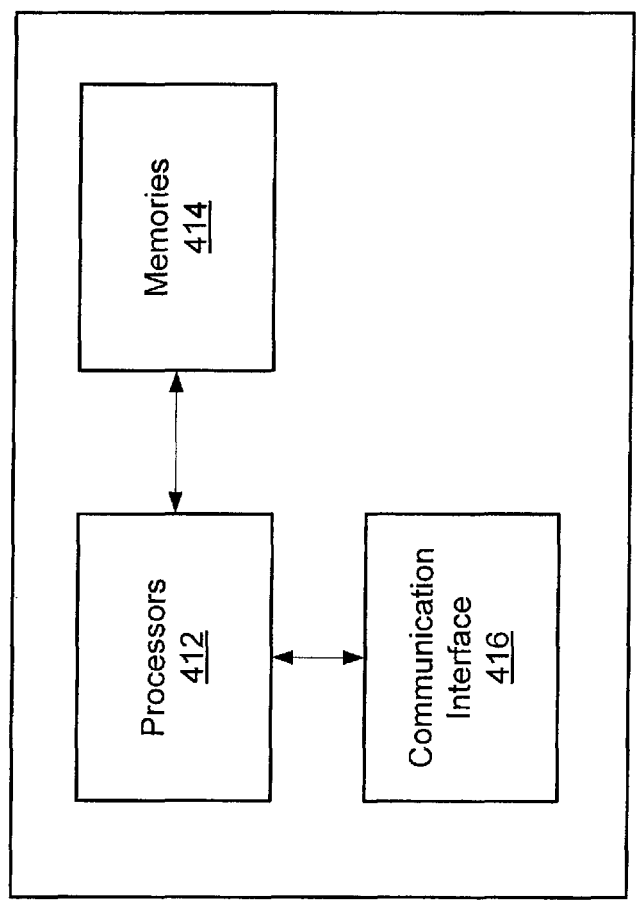
FIG. 4B illustrates an illustrative apparatus in the digital broadcast or multicast system.

Each of transmitter 406 and user terminals 410 may respectively be an apparatus that has one or more processors and one or more memories or other computer readable medium configured to store computer executable instructions. FIG. 4B illustrates an illustrative apparatus. For example, the apparatus may be, for example, a mobile terminal, a smartphone, or a mobile device that includes processors 412, memories 414, and a communication interface 416. The processors 412 may be, for example, application specific integrated circuits (ASICs), general purpose microprocessors, or other processing devices. The processors 412 may be configured to carry out the operations described herein. For example, the processors 412 may carry out instructions stored as executable code or as hard-wired logic.

The memories 414 may be implemented with any combination of read only memory modules or random access memory modules, optionally including both volatile and non-volatile memory. Examples of computer readable media include hard drives, random access memory (RAM), read only memory (ROM), floppy disks, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the processors 412.

The computer executable instructions may include applications and operating system software, and code segments, instructions, applets, pre-compiled code, compiled code, computer programs, program modules, engines, program logic, and combinations thereof. The one or more processors 412 may process the computer executable instructions to perform the operations described herein. The communication interface 416 may communicate data to and from the processors 412 via the network 408. Although multiple processors and memories are shown in FIG. 4B, processors 412 can be a single processor and memories 414 can be a single memory, and/or they can be combined onto a single chip.

At least some example embodiments described herein provide two different types of integration between DVB-T2 (ETSI EN 302 755) and DVB-NGH so as to allow backwards compatibility between DVB-NGH and DVB-T2. In at least some embodiments involving physical layer pipe (PLP) integration, NGH PLPs are transmitted in a same physical layer T2 frame as T2 PLPs, thereby combining DVB-T2 and DVB-NGH systems at the PLP level. In at least some additional embodiments involving FEF integration, NGH signaling is transmitted using future extension frames (FEF) of DVB-T2. PLP integration is discussed below with reference to FIGS. 5-7, and FEF integration is discussed in FIG. 8.

T2 L1-pre signaling 111 is inadequate to signal NGH PLP parameters. In DVB-T2, T2 L1-pre signaling 111 provides only six reserved bits 202 (see FIG. 2, RESERVED) that can be used to enable enhanced signaling transmission for NGH. The six L1-pre signaling bits, however, are not enough to signal NGH PLP parameters, for example, PLP size, in a conventional T2 fashion. The example embodiments discuss NGH L1 signaling transmission using PLP integration to overcome this and other limitations.

Figure 5:
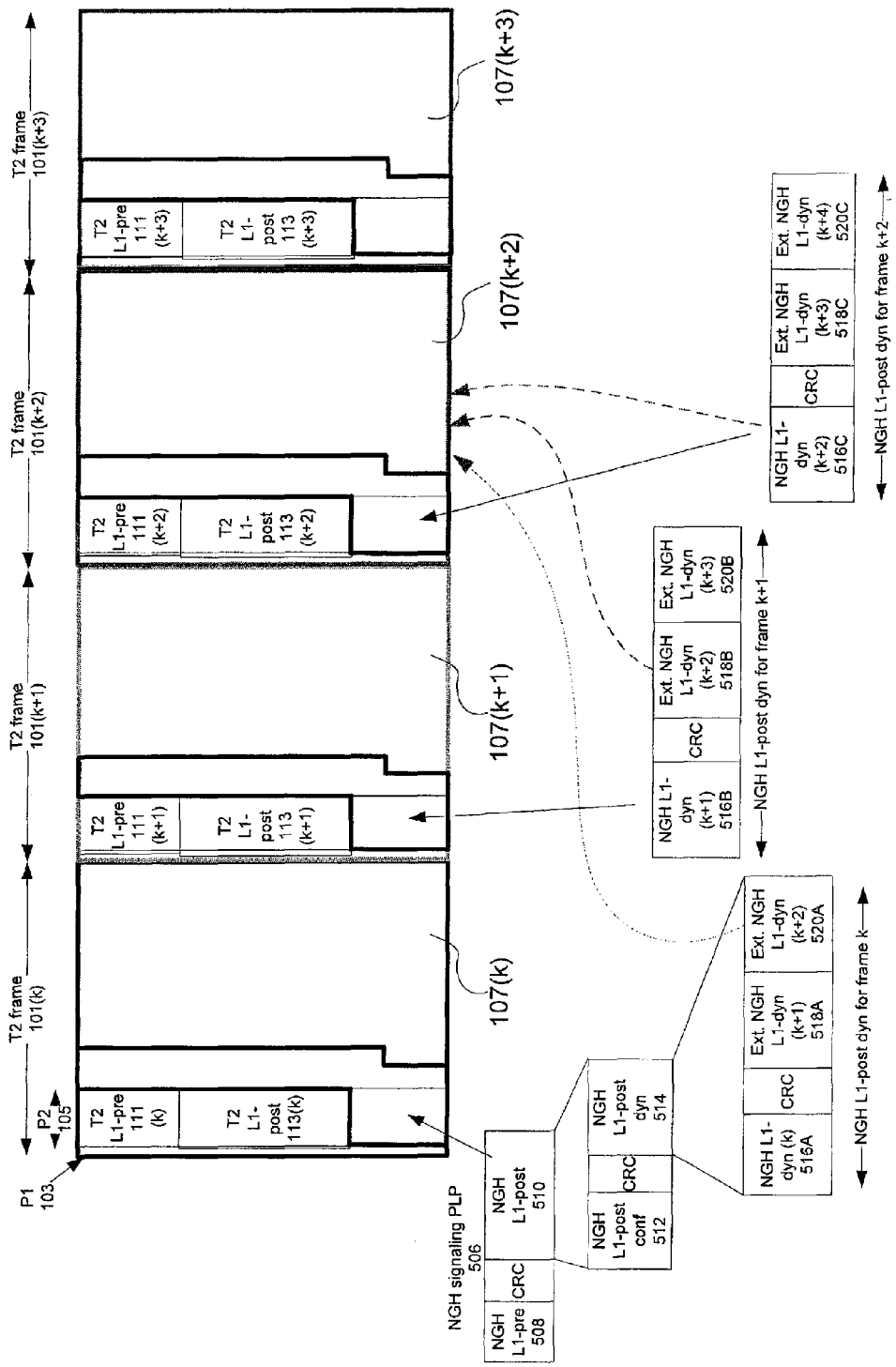
FIG. 5 illustrates four consecutive T2 frames (from k to k+3) using physical layer pipe (PLP) integration in an L1 signaling transmission in accordance with at least some embodiments.

FIG. 5 illustrates four consecutive T2 frames 101 (from k to k+3) using PLP integration in an L1 signaling transmission. The transmitter 406 (see also FIG. 4) may generate the T2 frame 101 in the depicted format, including the signaling and data described below, for transmission to the user terminal 410 via the network 408. The T2 frames 101 may be compatible with user terminals 410 using DVB-NGH and/or DVB-T2. If the user terminal 410 is not configured to receive NGH signaling, the user terminal 410 may simply ignore the NGH signaling in the current T2 frame 101 and process the next. Thus, T2 frames may be used to communicate data used by either DVB-NGH or DVB-T2 systems. Coding and interleaving may also be applied over the T2 frames (blocks) 101 to benefit from time diversity.

Each T2 frame 101 may include T2 L1-pre signaling 111 and T2 L1 post-signaling 113 for the T2 PLPs according to the DVB-T2 standard, for example, using zig-zag mapping over P2 symbols. The T2 L1-pre signaling 111 may be protected by a strong code and may be separate from the T2 L1-post signaling 113 in DVB-T2. The T2 frame 101 may also include a dedicated NGH signaling PLP 506 and data symbols 107. The dedicated NGH signaling PLP 506 may be positioned at a predefined PLP location within the T2 frame (for example, at the first PLP in the T2 frame 101 immediately following the T2 L1 post-signaling 113).

Because the NGH signaling PLP 506 is transmitted in a T2 PLP in this example, user terminals 410 that have T2, but not NGH capabilities, do not need to decode and may ignore the NGH signaling PLP 506. The location of NGH signaling PLP 506 within the T2 frame 101 may be fixed (for example, the first PLP in the T2 frame), so that user terminals 410 having NGH capabilities do not need to decode the T2 dynamic signaling 117 to determine the location of the NGH signaling PLP 506 within the T2 frame 101 to avoid any poor performance issues of the T2 dynamic signaling 117.

The reserved bits 202 (see also FIG. 2) of the T2 L1-pre signaling 111 may indicate whether the NGH signaling PLP 506 is present in the T2 frame 101. The T2 L1 pre-signaling 111 may further indicate a modulation scheme (for example, QPSK, BSK, etc.) and multiplexing rate for decoding the NGH L1 pre-signaling 508 within the NGH signaling PLP 506. The decoded NGH L1 pre-signaling 508 may then be used to decode the NGH L1 post signaling 510. The transmitter 406 may thus avoid signaling the length in OFDM cells of the NGH signaling PLP 506 in the T2 frame 101, by instead providing the user terminal 410 with the modulation scheme and multiplexing rate to directly access the NGH L1 pre-signaling 508 in the NGH signaling PLP 506.

The NGH signaling PLP 506 may include NGH L1 pre-signaling 508, NGH L1 post-signaling 510, and a cyclic redundancy check (CRC). The NGH L1 pre-signaling 508 may be coded into an LDPC block within the NGH signaling PLP 506. The NGH L1 pre-signaling 508 may provide information for the user terminal 410 to decode the NGH L1 post-signaling 510.

The NGH L1 post-signaling 510 may contain parameters which provide information for the receiver to decode the desired physical layer pipes within the T2 frame 101. The NGH L1-post signaling 510 may include configurable and dynamic parameters: NGH L1 post configurable (conf) signaling 512 and NGH L1 post dynamic (dyn) signaling 514. The configurable parameters may remain the same for the duration of one superframe (for example, one superframe carrying more than one T2 frame 101), while the dynamic parameters may provide information which may be specific for the current T2 frame 101. The values of the dynamic parameters may change during the duration of one superframe, while the size of NGH L1 post dyn signaling 514 may remain the same in each T2 frame 101. Also, extended NGH L1 post conf signaling 512 can be encoded, split and transmitted over several T2 frames 101 to obtain time diversity.

The NGH L1 post dyn signaling 514 may be further subdivided into sections that are transmitted over a current and one or more previous T2 frames 101. For example, NGH L1 dyn signaling 516 and Extension (Ext) NGH L1 dyn signaling 518 and 520 may be distributed over three T2 data frames (k, k+1, and k+2), although a different number of data frames may be supported. In an example depicted in FIG. 5, dashed arrows lead from NGH L1 post dyn signaling 514 of frames k to k+2 to the data symbols 107(k+2) of T2 frame 101(k+2), indicating that the signaling fields 516C, 518B, and 520A collectively provide signaling for T2 frame 101(k+2).

Encoding spanning subparts or the entire T2 frame 101 may be further applied. For example, a CRC field may encode NGH L1 dyn signaling 516, and Ext NGH L1 dyn signaling 518 and 520. Additional encoding may be applied using Bose-Chaudhuri-Hocquenghem (BCH) and LDPC encoding. In case the NGH L1 dyn 516 is composed of information and parity, the CRC field may be located inside the NGH L1 dyn signaling 516 after the information part and before the parity. FIG. 5 illustrates CRCs used to encode other subparts of the T2 frame 101.

Figure 6:
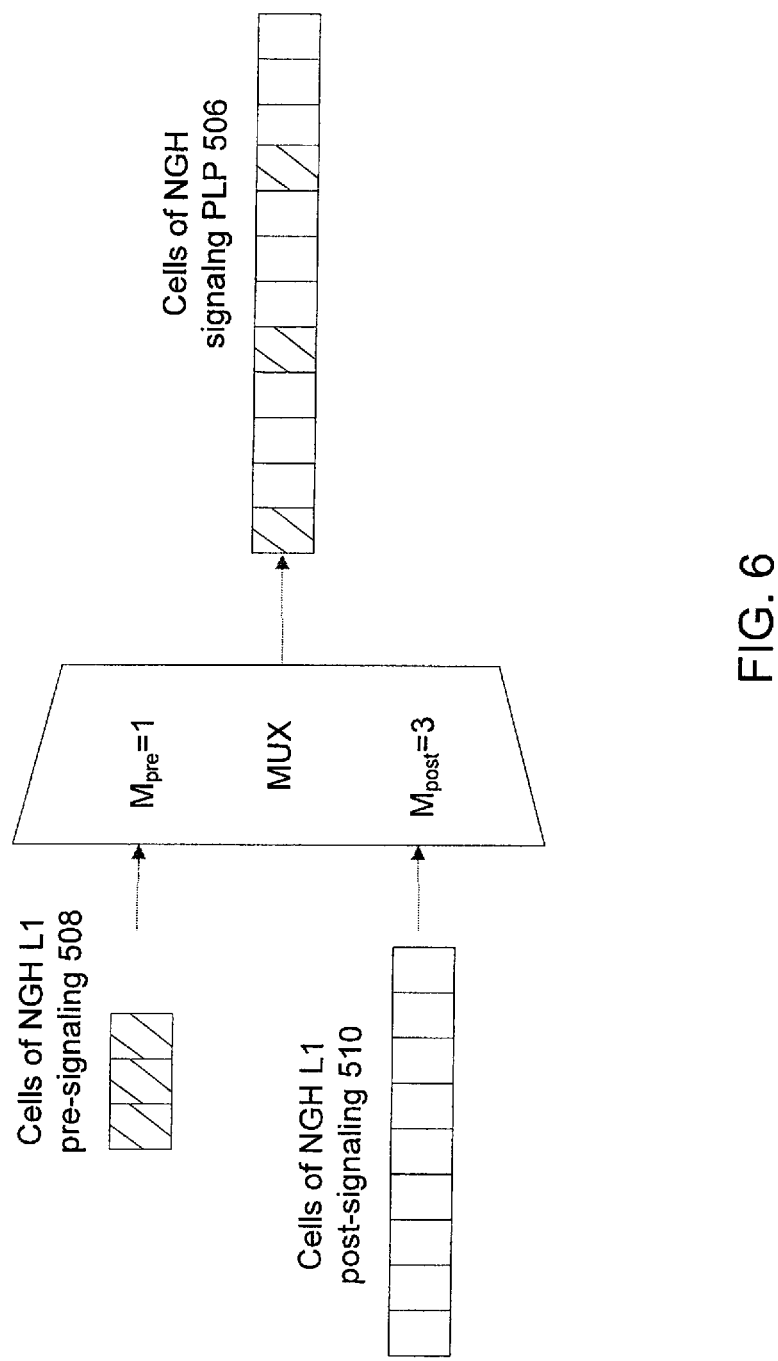
FIG. 6 illustrates an example of multiplexing cells of next generation handheld L1 pre signaling and L1 post signaling in accordance with at least some embodiments.

Prior to transmission, the transmitter 406 may multiplex the NGH L1 pre signaling 508 and L1 post signaling 510 into the NGH signaling PLP 506 to spread the NGH L1 pre-signaling 508 over the PLP 506. FIG. 6 illustrates an example of multiplexing cells of NGH L1 pre signaling 508 and NGH L1 post signaling 510 in accordance with at least some embodiments. Because the NGH L1 post signaling 510 may be significantly longer than the NGH L1 pre signaling 508, the multiplexing rate for the NGH L1 post signaling 510 may be a configurable parameter signaled in the reserved bits 202 of NGH L1 pre signaling 508. In an example, a multiplexing rate $M_{pre}$ for the cells transporting NGH L1 pre signaling 508 may be one and a multiplexing rate $M_{post}$ for cells transporting NGH L1 post signaling 510 may be three. Thus, cells of NGH signaling PLP 506 may transport three times more cells of NGH L1 post signaling 510 than cells transporting NGH L1 pre signaling 508. The cross-hatching in FIG. 6 may represent cells of NGH L1 pre signaling 508 that may be multiplexed within the NGH signaling PLP 506.

The cells of the NGH signaling PLP 506 transporting the NGH L1 pre signaling 508 and NGH L1 post signaling 510 may also be individually interleaved, but time interleaving may not be applied on the NGH signaling PLP 506 to permit the user terminal 410 to receive the NGH L1 pre signaling 508 without knowing the size of the NGH signaling PLP 506. For example, in DVB-T2, time interleaving may be applied on a PLP level. The transmitter 406 may include individual (time) interleavers for the NGH L1 pre signaling 508 and NGH L1 post signaling 510, but no interleaver for the NGH signaling PLP 506. The transmitter 406 may then assemble and communicate the T2 frame 101 to the user terminal 410 for decoding.

Figure 7:
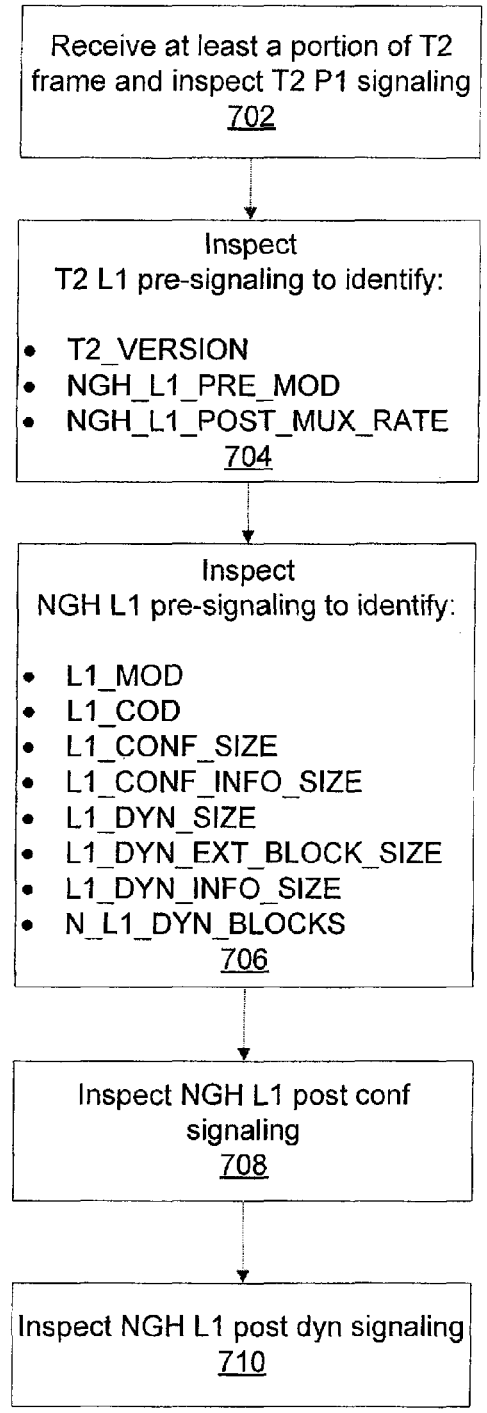
FIG. 7 is a flow diagram showing a method for processing a T2 frame that uses PLP integration to include NGH signaling in accordance with at least some embodiments.

FIG. 7 illustrates a flow diagram showing a method for processing a T2 frame that uses PLP integration to include NGH signaling in accordance with at least some embodiments.

In block 702, the user terminal 410 may receive a T2 frame and inspect its P1 signaling. For example, the user terminal 410 may inspect the reserved bits 202 (see also FIG. 2) of the P1 signaling 109 to determine the presence of the NGH signaling PLP 506 in the T2 frame 101.

In block 704, the user terminal 410 may inspect the T2 L1 pre-signaling 111 of the T2 frame to identify a T2_version, NGH_L1_PRE_MOD, and an NGH_L1_POST_MUX_RATE for decoding of the NGH signaling PLP 506. The T2_version may be a 4-bit field indicating the version of the DVB-T2 specification document on which the received T2 frame 101 is based. The T2_version may be signaled, for example, according to Table 1, below, and a value of '0010' may indicate that the first PLP of the T2 frame 101 following the T2 L1 post-signaling 113 is the NGH signaling PLP 506. If the T2_version is set to '0010', then the usage of the reserved bits 202 in the T2 L1 pre-signaling 111 (see also FIG. 2) may be defined in the NGH specification, and may signal the constellation used and length of the NGH signaling PLP 506.

TABLE 1

Signaling format for T2_version field

| Value | Specification version |
|---|---|
| 0000 | 1.1.1 |
| 0001 | 1.2.1 |
| 0010 | (for example, 2.0) |
| 0010-1111 | Reserved for future use |

The NGH L1_PRE_MOD may be a 2 bit field indicating a modulation constellation of the NGH L1 pre-signaling 508. Constellation values may be signaled according to Table 2, below. The user terminal 410 may use the modulation constellation to calculate a length in OFDM cells of the NGH L1 pre-signaling 508.

TABLE 2

Signaling format for NGH L1-post constellations

| Value | Constellation |
|---|---|
| 00 | Binary Phase Shift Keying (BPSK) |
| 01 | Qaudrature Phase Shift Keying (QPSK) |
| 10 | 16-Qaudrature Amplitude Modulation (QAM) |
| 11 | Not applicable (NA) |

Also, the modulation constellation of the NGH L1 pre-signaling 508 may be fixed for all T2 frames 101, and hence NGH_L1_PRE_MOD may be omitted from the T2 L1 pre-signaling 111.

The NGH_L1_POST_MUX_RATE may be a 4 bit field indicating a multiplexing rate for the NGH L1 post signaling 514 (for example, $M_{post}$ in FIG. 6), including NGH L1 post dyn 516 and extension blocks 518 and 520. The multiplexing rate for the NGH L1 pre signaling 508 may be fixed (for example, $M_{pre}$ in FIG. 6). The user terminal 410 may extract the multiplexing rate $M_{post}$ for NGH L1 post signaling 510 to extract NGH L1 pre-signaling 508 from the NGH signaling PLP 506. For example, if $M_{pre}=1$ and $M_{post}=3$, as in FIG. 6, then the user terminal 410 may extract every fourth cell from the NGH signaling PLP 506 to extract the NGH L1 pre-signaling 508. The remaining cells in the NGH signaling PLP 506 may be the NGH L1 post-signaling 510.

Table 3 below illustrates an illustrative signaling format for the NGH_L1_POST_MUX_RATE.

TABLE 3

Signaling format for NGH L1-post dynamic multiplexing rate $M_{post}$

| Value | Multiplexing rate ($M_{post}$) |
|---|---|
| 0000 | 1 |
| 0001 | 2 |
| 0010 | 3 |
| 0011 | 4 |
| 0100 | 5 |
| 0101 | 6 |
| 0110 | 7 |
| 0111 | 8 |
| 1000 | 9 |
| 1001 | 10 |
| 1010 | 11 |
| 1011 | 12 |
| 1100 | 13 |
| 1101 | 14 |
| 1110 | 15 |
| 1111 | 16 |

The number of bits allocated for NGH_L1_POST_MUX_RATE may vary, and the multiplexing rate values may be adjusted, for example, the granularity of the values may be higher or lower than one. In another embodiment, the bits may be used to signal the length of the signaling PLP, for example in bits, in number of FEC blocks, or in number of OFDM symbols.

In block 706, the user terminal 410 may inspect the NGH L1 pre-signaling 508 to identify the parameters for decoding the NGH L1 post conf signaling 512 and NGH L1 post dyn signaling 514. The NGH L1 pre signaling 508 may provide the signaling parameters carried within the NGH L1 post conf signaling 512 and for the reception of NGH L1 post dyn signaling 514. The transmitter 406 may encode the NGH L1 post conf signaling 512 separately from NGH L1 post dyn signaling 514, and the user terminal 410 may separately decode NGH L1 post conf signaling 512 and NGH L1 post dyn signaling 514. Separate decoding of NGH L1 post conf signaling 512 and NGH L1 post dyn signaling 514 permits the user terminal 410 to average the NGH L1 post conf signaling 512 over multiple T2 frames 101 to potentially lessen the effects of a fading channel.

For example, the NGH L1 post conf 512 may be encoded by an LDPC code, and the NGH L1 post dyn 514 may be encoded with another LDPC code. NGH L1 post conf 512 and NGH L1 post dyn 514 may also be encoded by being located in different FEC blocks. If, instead, the NGH L1 post conf 512 and NGH L1 post dyn 514 were in the same FEC block, parity data would not be the same in consecutive T2 frames and could prevent the user terminal 410 from using diversity combining before decoding. Also, the user terminal 410 may access the NGH L1 post dyn 514 without decoding NGH L1 post conf 512. As such, an error in the NGH L1 post conf 512 might not cause the user terminal 410 to fail decoding of the NGH L1 post dyn 514. Further, the NGH L1 post conf 512 only changes once per superframe, so the user terminal 410 may only have to decode the NGH L1 post conf 512 once.

In an example, the NGH L1 pre-signaling 508 may include L1_MOD, L1_COD, L1_CONF_SIZE, L1_CONF_INFO_SIZE, L1_DYN_SIZE, L1_DYN_EXT_BLOCK_SIZE, L1_DYN_INFO_SIZE, and N_L1_DYN_BLOCKS. The parameters L1_MOD and L1_COD, respectively, may indicate the modulation constellation and coding of NGH L1 post conf signaling 512 and of the NGH L1 post dyn signaling 514. The user terminal 410 may use the parameters L1_MOD and L1_COD signal to determine the size (for example, number of OFDM cells) of the NGH L1 post dyn signaling 514. Table 4, below, lists example values of the modulation constellation and code rates of the NGH L1 post-signaling 510. In some embodiments NGH L1 pre-signaling might not include all the parameters listed above and may only include a subset of the parameters in the NGH L1 pre-signaling.

TABLE 4

Signaling format for NGH L1-post signaling modulation constellations

| Value | Constellation |
|---|---|
| 00 | BPSK |
| 01 | QPSK |
| 10 | 16-QAM |
| 11 | NA |

TABLE 5

Signaling format for code rates of NGH L1 post-signalling.

| Value | Code rate (see note) |
|---|---|
| 000 | 1/2 |
| 001 | 3/5 |
| 010 | 2/3 |
| 011 | 3/4 |
| 100 | 4/5 |
| 101 | 5/6 |
| 110 | 1/4 (not in T2) |
| 111 | 1/3 (not in T2) |

Other signaling formats and code rates may also be used.

The user terminal 410 may use the parameters L1_CONF_SIZE, L1_CONF_INFO_SIZE, L1_DYN_SIZE, L1_DYN_EXT_BLOCK_SIZE, L1_DYN_INFO_SIZE, and N_L1_DYN_BLOCKS obtained from the NGH L1 pre-signaling 508 to enable access into the different parts of the NGH L1 post-signaling 510.

The field L1_CONF_SIZE may indicate the length in OFDM cells or in LDPC blocks of the NGH L1 post conf signaling 512, which might be unknown until the user terminal 410 decodes the NGH L1-pre signaling 508. L1_CONF_INFO_SIZE may indicate the number of information bits belonging to the NGH L1 post conf signaling 512 and may exclude any padding.

L1_DYN_SIZE may indicate the length of the NGH L1 post dyn signaling 514 in one T2 frame 101, including the Ext NGH L1 post dyn signaling blocks 518 and 520. In conventional DVB-T2, the L1_DYN_SIZE is announced in OFDM cells. In NGH, transmission capacity may be saved by signaling only the number of Forward Error Correction (FEC) blocks. For example, one FEC block may be transmitted using many OFDM cells (for example, carriers), and signaling the number of FEC blocks instead of cells reduces the amount of signaling and increases data capacity. The NGH L1 post conf signaling 512, for instance, may be composed of one or more FEC blocks. L1_DYN_EXT_BLOCK_SIZE may indicate the size of one parity extension block (for example, block 518 or 520). All extension blocks may have the same length.

L1_DYN_INFO_SIZE may indicate the number of information bits belonging to the NGH L1 post dyn signaling 514 for a current T2 frame and may exclude possible padding. N_L1_DYN_BLOCKS may indicate the number of blocks, and may include extension blocks 518 and 520, associated with L1 signaling for one T2 frame. The number of blocks may be equivalent to the number of preambles over which the L1 signaling data is distributed. For example, in FIG. 5, N_L1_DYN_BLOCKS may be three as there are three blocks (for example, 516C, 518A, and 520B) that together signal T2 frame 101(k+2). In another embodiment N_L1_DYN_BLOCKS field may indicate only the number of blocks in the extension blocks 518 and 520.

The parameters L1_CONF_INFO_SIZE, L1_DYN_INFO_SIZE, L1_DYN_EXT_BLOCK_SIZE, and N_L1_DYN_BLOCKS may contain the minimum information that is needed in the NGH L1 pre-signaling 508 for decoding of the NGH L1 post-signaling 510. In a simple system, where most parameters are fixed, only the minimum information may be signaled and the rest of the parameters (for example, modulation, code rate, etc.) can be predetermined, fixed to the parameters of NGH L1 post conf signaling 512, or signaled within NGH L1 post dyn signaling 514. Also, separate fields L1_CONF_MOD, L1_CONF_COD, L1_DYN_MOD, L1_DYN_COD may be used if different modulations for NGH L1-post conf and dyn signaling 512 and 514 are defined in NGH.

In block 708, the user terminal may inspect the NGH L1 post conf signaling 512. The NGH L1 post conf signaling 512 may include parameters which provide information for the user terminal 410 to decode the desired physical layer pipes. The parameters (for example, code rate, modulation, FEC block size, etc.) of NGH L1 post conf signaling 512 may remain the same for the duration of one superframe (for example, one superframe carrying more than one T2 frame 101).

In block 710, the user terminal may inspect the NGH L1 post dyn signaling 514. The NGH L1 post dyn signaling 514 may include parameters which provide information for the user terminal 410 to decode the desired physical layer pipes which may be specific for the current T2 frame 101. For example, the starting position and the length for each PLP may change from T2 frame to frame. The values of the dynamic parameters may change during the duration of one superframe, while the size of the NGH L1 post dyn signaling 514 may remain the same in each T2 frame. The method of FIG. 7 may then end.

Figure 8:
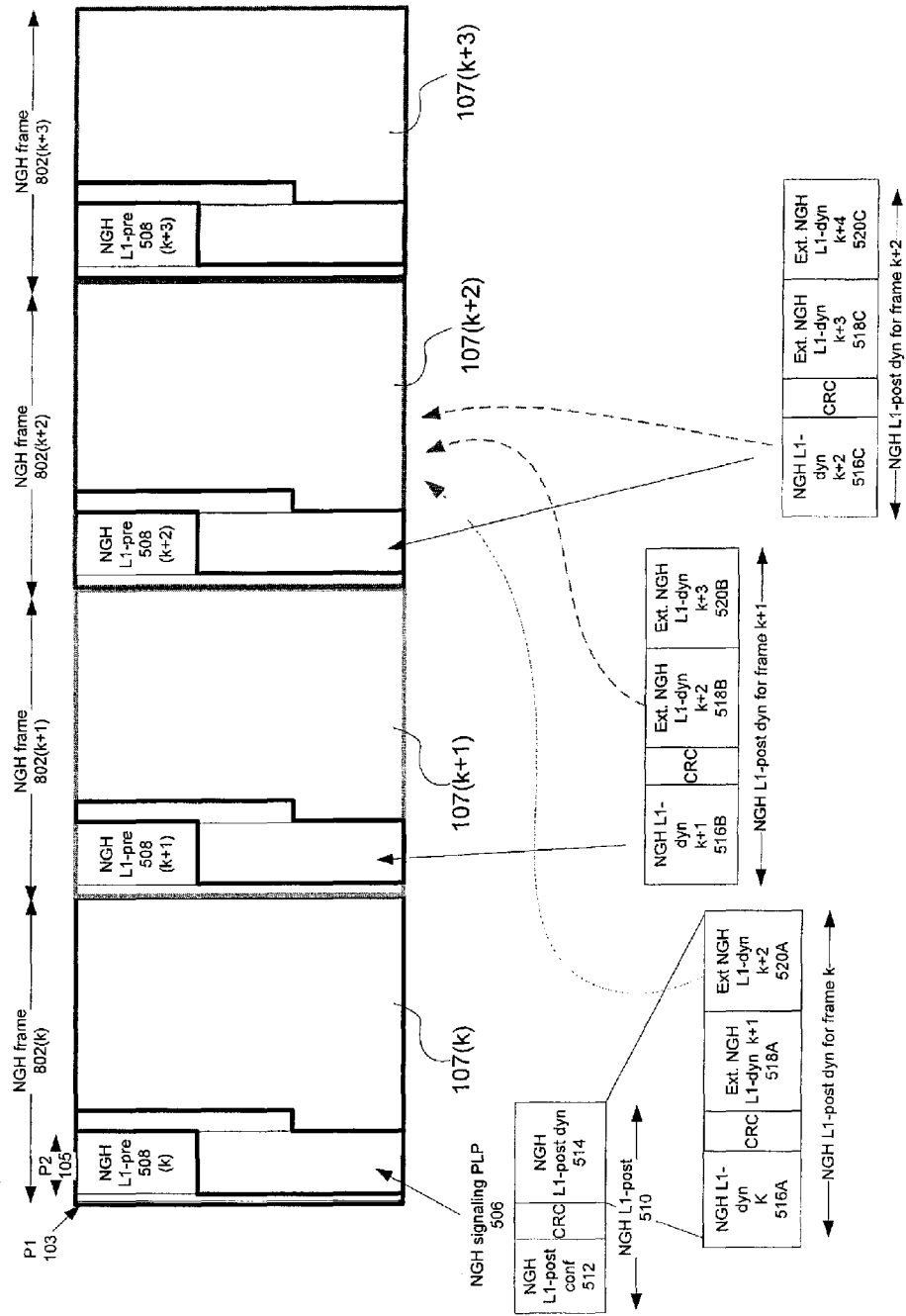
FIG. 8 illustrates four consecutive next generation handheld frames (from k to k+3) using future extension frame (FEF) integration in an L1 signaling transmission in accordance with at least some embodiments.

The concepts above may also be used to permit transport of NGH signaling using future extension frames (FEFs) of DVB-T2 to provide backwards compatibility between DVB-NGH and DVB-T2. FIG. 8 illustrates another embodiment with four consecutive NGH frames 802 (from k to k+3) using FEF integration in an L1 signaling transmission. FEFs enable carrying of frames defined in a future extension of DVB-T2 in the same multiplex as conventional T2 frames. In FEF integration, DVB-NGH services may be transmitted in the same RF signal as the FEFs. In PLP integration, discussed above, DVB-NGH services are transmitted inside the same DVB-T2 physical layer frame 101 as PLPs. FEF integration may replace the T2 L1 pre-signaling 111 and T2 L1 post signaling 113 with NGH L1 pre signaling 804 in an NGH frame 802. NGH L1 pre signaling 804 may contain at least some of the parameters in the T2 L1 pre signaling 111 and instructions to permit the user terminal 410 to decode and access NGH signaling PLP 506. The NGH signaling PLP 506 may transport the NGH post signaling 510. Excluding the extensions to T2 signaling field, all parameters in the NGH signaling PLP 506 discussed above are the same in FEF integration. Thus, elements 510-520 in FIG. 8 are the same as described above in FIG. 5. FEFs may be used to transport NGH signaling using future extension frames (FEFs) of DVB-T2 to provide compatibility between DVB-NGH and DVB-T2. One advantage of FEF integration is that is allows different FFT sizes. In PLP integration, the FFT size may be the same, but, allows T2 frames to transport NGH services without using FEFs.

Figure 9:
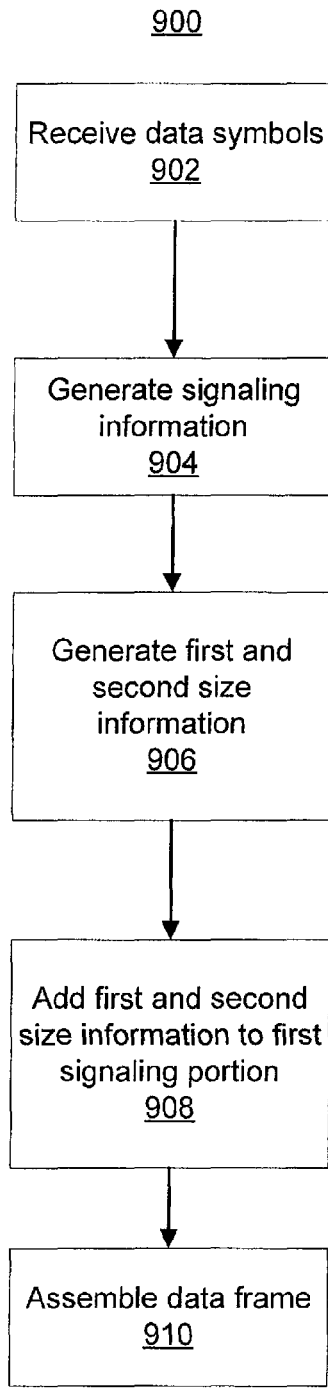
FIG. 9 is a flow diagram showing a method for generating a data frame in accordance with at least some embodiments.

FIG. 9 illustrates a flow diagram of an example method for generating a data frame in accordance with at least some embodiments. The method 900 may begin at block 902.

In block 902, the method may include receiving one or more data symbols for transmission in a data frame. The transmitter 406 may receive data symbols 107 from a digital content source for transmission in a T2 frame 101 or a NGH frame 802 to a user terminal 410.

In block 904, the method may include generating signaling information that identifies transmission parameters for the data frame. The signaling information may include a first signaling portion and a second signaling portion. The second signaling portion may include a third signaling portion and a fourth signaling portion. The transmitter 406 may process information to be included in the data frame, and may generate signaling to permit decoding and demodulating by the user terminal 410. For instance, the transmitter 406 may set the reserved bits 202 in the T2 L1 pre signaling 111 to specify the presence of an NGH signaling PLP 506 in a T2 frame, may generate the T2 L1 pre signaling 111 to specify the T2 version, and so forth such that the T2 frame 101 conforms and includes the signaling shown in FIG. 5. The transmitter 406 may also specify corresponding information in the NGH frame 802 shown in FIG. 8.

In a first example of generating signaling information using PLP integration, the transmitter 406 may generate NGH signaling information for inclusion in PLP 506 of a T2 frame 101. In a second example of generating signaling information using FEF integration, the transmitter 406 may generate NGH signaling information for inclusion in PLP 506 of a NGH frame 802. For both the first and second examples, the NGH signaling PLP 506 may include NGH L1 pre-signaling 508 as a first signaling portion and NGH L1 post-signaling 510 as a second signaling portion. The NGH L1 post-signaling 510 may include NGH L1 post conf signaling 512 as a third signaling portion and NGH L1 post dyn signaling 512 as a fourth signaling portion.

In block 906, the method may include generating at least one first size information for the third signaling portion and at least one second size information for the fourth signaling portion. Continuing the first and second examples above, the transmitter 406 may generate parameters for L1_CONF_SIZE as at least first size information on the size (for example, number of cells) of NGH L1 post conf signaling 512 and L1_DYN_SIZE as at least second size information on the size (for example, number of cells) of NGH L1 post dyn signaling 514. In either the first or second example, the transmitter 406 may generate information instead of or in addition to L1_CONF_SIZE and L1_DYN_SIZE, such as, but not limited to, L1_MOD, L1_COD, L1_CONF_INFO_SIZE, L1_DYN_EXT_BLOCK_SIZE, L1_DYN_INFO_SIZE, N_L1_DYN_BLOCKS, other parameters described herein, and/or any combination thereof.

In block 908, the method may include adding the at least one first size information and the at least one second size information to the first signaling portion. Continuing the first and second examples above, the transmitter 406 may add L1_CONF_SIZE and L1_DYN_SIZE to the NGH L1 pre signaling 508.

In block 910, the method may include assembling the data frame including at least the first signaling portion, the second signaling portion, and the data symbols. Continuing the first example above, the transmitter 406 may assemble the T2 frame 101 including the NGH L1 pre signaling 508, NGH L1 post signaling 510, and data symbols 107. The transmitter 406 may then cause transmission of the T2 frame 101 to the user terminal 410 via the network 408. Continuing the second example above, the transmitter 406 may assemble the NGH frame 802 including the NGH L1 pre signaling 508, NGH L1 post signaling 510, and data symbols 107. The transmitter 406 may then cause transmission of the NGH frame 802 to the user terminal 410 via the network 408. The method of FIG. 9 may then end.

Figure 10:
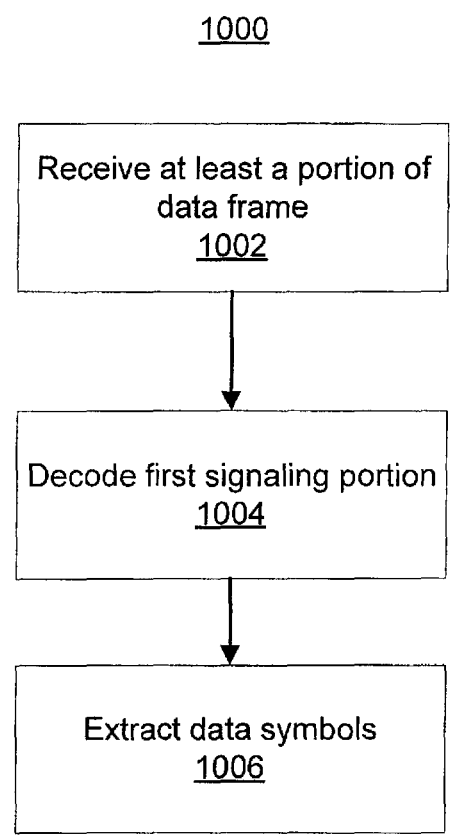
FIG. 10 is a flow diagram showing a method for receiving and processing a data frame in accordance with at least some embodiments.

FIG. 10 is a flow diagram showing an example method for receiving and processing a data frame in accordance with at least some embodiments. The method 1000 may begin in block 1002.

In block 1002, the method may include receiving part or all of a data frame. In a first example, the user terminal 410 may receive part or all of a T2 frame 101. In a second example, the user terminal 410 may receive part or all of a NGH frame 802. The user terminal 410 may begin processing the received portions of the T2 frame 101 and/or the NGH frame 802 even though less than all data of either frame has been received. For instance, the user terminal 410 may receive the T2 L1 pre signaling 111, T2 L1 post signaling 113, and the NGH signaling PLP 506 of the T2 frame 101, but not the data symbols 107. Similarly, the user terminal 410 may receive the NGH L1 pre signaling 508 and the NGH signaling PLP 506 of the NGH frame 802, but not the data symbols 107.

In block 1004, the method may include decoding a first signaling portion of the data frame to identify, for a second signaling portion, a first size of a third signaling portion of the second signaling portion and a second size of a fourth signaling portion of the second signaling portion. Continuing the first and second examples, the user terminal 410 may decode NGH L1 pre signaling 508 to identify a L1_CONF_SIZE and L1_DYN_SIZE of the NGH L1 post-signaling 510. In either the first or second example, the user terminal 410 may decode information instead of or in addition to L1_CONF_SIZE and L1_DYN_SIZE, such as, but not limited to, L1_MOD, L1_COD, L1_CONF_INFO_SIZE, L1_DYN_EXT_BLOCK_SIZE, L1_DYN_INFO_SIZE, N_L1_DYN_BLOCKS, other parameters described herein, and/or any combination thereof.

In block 1006, the method may include extracting data symbols from the data frame based on the first and second sizes. Continuing the first example, the user terminal 410 may use the L1_CONF_SIZE and L1_DYN_SIZE to determine an end of the NGH signaling PLP 506 and a beginning of the data symbols 107 to extract the data symbols from the T2 frame 101. Continuing the second example, the user terminal 410 may use the L1_CONF_SIZE and L1_DYN_SIZE to determine an end of the NGH signaling PLP 506 and a beginning of the data symbols 107 to extract the data symbols from the NGH frame 802. In either the first or second example, the user terminal 410 may also extract data symbols 1007 using, instead of or in addition to L1_CONF_SIZE and L1_DYN_SIZE, other parameters such as, but not limited to, L1_MOD, L1_COD, L1_CONF_INFO_SIZE, L1_DYN_EXT_BLOCK_SIZE, L1_DYN_INFO_SIZE, N_L1_DYN_BLOCKS, other parameters described herein, and/or any combination thereof. The method 1000 may then end.

While the disclosure has been described with respect to specific examples, those skilled in the art will appreciate that there are numerous variations and permutations of the above described systems and techniques that fall within the spirit and scope of the disclosure. Additionally, numerous other embodiments, modifications and variations within the scope and spirit of the disclosure will occur to persons of ordinary skill in the art.

We claim:

1. A method comprising:
   receiving at least one data symbol for transmission in a data frame;
   generating signaling information that identifies transmission parameters for the data frame, wherein the signaling information includes a first signaling portion and a second signaling portion, wherein the second signaling portion includes at least a third signaling portion and a fourth signaling portion, and wherein the first signalling portion indicates a size of a parity extension block for the fourth signalling portion;
   generating at least one first size information for the third signaling portion;
   generating at least one second size information for the fourth signaling portion;
   adding the at least one first size information and the at least second size information to the first signaling portion;
   assembling, by at least one processor, the data frame comprising at least the first signaling portion, the second signaling portion, and the at least one data symbol; and
   transmitting the data frame through a digital broadcasting or multicasting system, wherein the signaling information comprises physical layer signaling data.

2. The method of claim 1, wherein the third signaling portion comprises a configurable part and the fourth signaling portion comprises a dynamic part.

3. The method of claim 1, wherein the first signaling portion comprises data indicative of a modulation constellation and a code rate applicable to the second signaling portion.

4. The method of claim 1, wherein the first signaling portion comprises layer 1 pre signaling.

5. An apparatus comprising:
   at least one processor; and
   at least one memory storing computer-executable instructions that, when executed by the at least one processor, cause the apparatus at least to perform:
   receive at least one data symbol for transmission in a data frame;
   generate signaling information that identifies transmission parameters for the data frame, wherein the signaling information includes a first signaling portion and a second signaling portion, wherein the second signaling portion includes at least a third signaling portion and a fourth signaling portion, and wherein the first signalling portion indicates a size of a parity extension block for the fourth signalling portion;
   generate at least one first size information for the third signaling portion;
   generate at least one second size information for the fourth signaling portion;
   add the at least one first size information and the at least second size information to the first signaling portion;
   assemble the data frame comprising at least the first signaling portion, the second signaling portion, and the at least one data symbol; and
   transmit the data frame through a digital broadcasting or multicasting system, wherein the signaling information comprises physical layer signaling data.

6. The apparatus of claim 5, wherein the third signaling portion comprises a configurable part and the fourth signaling portion comprises a dynamic part.

7. The apparatus of claim 5, wherein the first signaling portion comprises data indicative of a modulation constellation and a code rate applicable to the second signaling portion.

8. The apparatus of claim 5, wherein the first signaling portion comprises layer 1 pre signaling.

9. A computer readable medium storing computer-executable instructions that, when executed, cause an apparatus to perform operations comprising:
receiving at least one data symbol for transmission in a data frame;
generating signaling information that identifies transmission parameters for the data frame, wherein the signaling information includes a first signaling portion and a second signaling portion, wherein the second signaling portion includes at least a third signaling portion and a fourth signaling portion, and wherein the first signalling portion indicates a size of a parity extension block for the fourth signalling portion;
generating at least one first size information for the third signaling portion;
generating at least one second size information for the fourth signaling portion;
adding the at least one first size information and the at least second size information to the first signaling portion;
assembling the data frame comprising at least the first signaling portion, the second signaling portion, and the at least one data symbol; and
transmitting the data frame through a digital broadcasting or multicasting system, wherein the signaling information comprises physical layer signaling data.

10. A method comprising:
receiving, through a digital broadcasting or multicasting system, at least a portion of a data frame, wherein the portion of the data frame contains physical layer signaling information that identifies transmission parameters for the data frame and wherein the physical layer signaling information includes a first signaling portion and a second signaling portion, wherein the second signaling portion comprises a third signaling portion and a fourth signaling portion;
decoding, by at least one processor, the first signaling portion to identify a first size of the third signaling portion and a second size of the fourth signaling portion;
identifying, from the decoded first signaling portion, a size of a parity extension block for the fourth signalling portion;
decoding, by the at least one processor, the third signaling portion and fourth signaling portion; and
extracting data symbols from the data frame based on the decoded third and fourth signaling portion.

11. The method of claim 10, wherein the third signaling portion comprises a configurable part and the fourth signaling portion comprises a dynamic part.

12. The method of claim 10, further comprising:
processing the first signaling portion to determine a modulation constellation and a code rate applicable to the fourth signaling portion; and
decoding the fourth signaling portion based on the modulation constellation and the code rate.

13. The method of claim 10, wherein the first signaling portion comprises layer 1 pre signaling.

14. An apparatus comprising:
at least one processor; and
at least one memory storing computer-executable instructions that, when executed by the at least one processor, cause the apparatus at least to perform:
receive, through a digital broadcasting or multicasting system, at least a portion of a data frame, wherein the portion of the data frame contains physical layer signaling information that identifies transmission parameters for the data frame and wherein the physical layer signaling information includes a first signaling portion and a second signaling portion, wherein the second signaling portion comprises a third signaling portion and a fourth signaling portion;
decode the first signaling portion to identify a first size of the third signaling portion and a second size of the fourth signaling portion;
identify, from the decoded first signaling portion, a size of a parity extension block for the fourth signalling portion; and
extract data symbols from the data frame based on the first and second sizes.

15. The apparatus of claim 14, wherein the third signaling portion comprises a configurable part and the fourth signaling portion comprises a dynamic part.

16. The apparatus of claim 14, wherein the computer-executable instructions, when executed, cause the apparatus to perform:
processing the first signaling portion to determine a modulation constellation and a code rate applicable to the fourth signaling portion; and
decoding the fourth signaling portion based on the modulation constellation and the code rate.

17. The apparatus of claim 14, wherein the first signaling portion comprises layer 1 pre signaling.

18. A computer readable medium storing computer-executable instructions that, when executed, cause an apparatus to perform operations comprising:
receiving, through a digital broadcasting or multicasting system, at least a portion of a data frame, wherein the portion of the data frame contains physical layer signaling information that identifies transmission parameters for the data frame and wherein the physical layer signaling information includes a first signaling portion and a second signaling portion, wherein the second signaling portion comprises a third signaling portion and a fourth signaling portion;
decoding the first signaling portion to identify a first size of the third signaling portion and a second size of the fourth signaling portion;
identifying, from the decoded first signaling portion, a size of a parity extension block for the fourth signalling portion; and
extracting data symbols from the data frame based on the first and second sizes.

* * * * *